Figure 1:
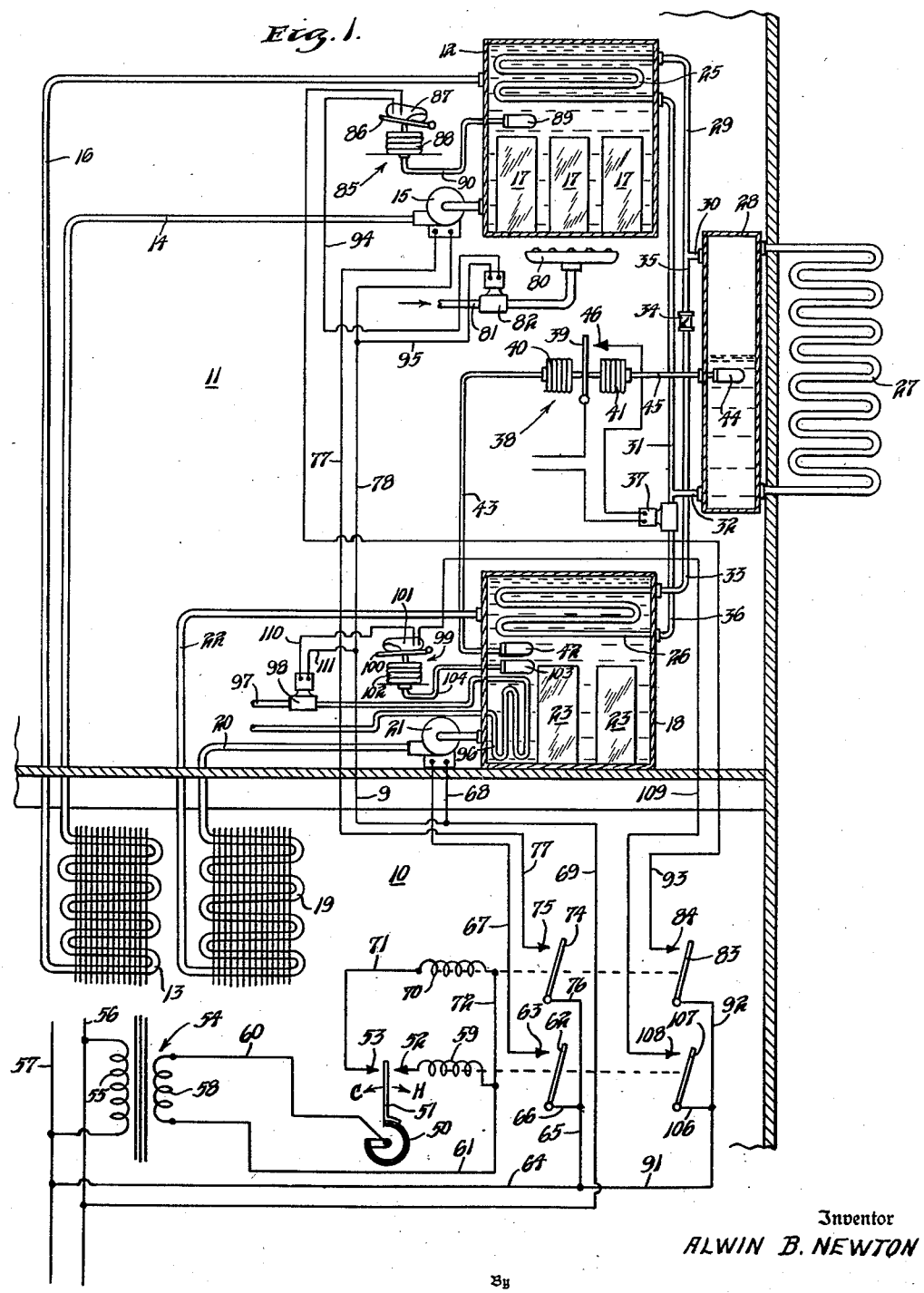

March 12, 1946.  A. B. NEWTON  2,396,338

RADIATION HEATING AND COOLING SYSTEM

Filed Feb. 24, 1943  2 Sheets-Sheet 1

Inventor
ALWIN B. NEWTON

By George H. Fisher
Attorney

March 12, 1946. A. B. NEWTON 2,396,338
RADIATION HEATING AND COOLING SYSTEM
Filed Feb. 24, 1943 2 Sheets-Sheet 2

Inventor
ALWIN B. NEWTON.
By George N. Fisher
Attorney

Patented Mar. 12, 1946

2,396,338

UNITED STATES PATENT OFFICE 2,396,338

RADIATION HEATING AND COOLING SYSTEM

Alwin B. Newton, Minneapolis, Minn., assignor to Minneapolis-Honeywell Regulator Company, Minneapolis, Minn., a corporation of Delaware Application February 24, 1943, Serial No. 476,891

16 Claims. (Cl. 257—3)

The present invention relates to heating and cooling by the transfer of heat from and to the universe by means of a radiation unit and constitutes an improvement upon my co-pending application Serial No. 415,433, filed October 17, 1941, now Patent No. 2,342,211, issued February 22, 1944, and entitled "Utilization of natural heating and cooling effects."

It is an object of my present invention to heat and cool a space, according to the requirements of such space, by providing independent heat and cold storing means which are respectively heated and cooled by a single radiation device so arranged as to permit the transfer of heat between such device and the universe by radiation so that the device is heated by radiation from the sun during the daytime and is cooled by radiation from the device to the universe at night.

It is a further object of my invention to provide means, preferably in the nature of automatic means, for selectively permitting the radiation device to heat the heat storing or cool the cold storing means, depending upon the relative temperatures of some or all of the heat and cold storing means and the radiation device.

In one form of my invention, the heating or cooling of the heating and cold storing means is controlled by the temperature differential between the radiation device, or the fluid therein, and the temperature of one of the storing means. It is therefore a further object of my invention to control the effect of the radiation device in respect to the heat and cold storing means in accordance with such differential temperature.

In another form of my invention, the effect of the radiating means or device upon the heat and cold storing means is controlled by the temperature of the fluid flowing through the radiation device. It is therefore a further object of the present invention to permit heating of the heat storing means by the radiation device when the temperature of the fluid flowing through such device is at or above a predetermined temperature, and to permit cooling of the cold storing means by the radiation device when the temperature of the fluid flowing therethrough is at or below a predetermined temperature.

A further object of the present invention is to control the effect of the heat and cold storing means upon the space in accordance with fluctuation in the space temperature.

Additionally, it is an object of my invention to supplement the action of the heat and cold storing means by additional heating and cooling means for heating and cooling such storing means.

Another object of the present invention is to control such additional heating and cooling means by the temperatures of the heat and cold storing means. Preferably, such additional heating and cooling means are placed in operation upon a further fall or rise in space temperature, as the case may be.

It is another object of my invention to place the additional cooling means into operation before the space temperature rises to a high value if the humidity is high when an intermediate rise in space temperature occurs.

Another object of the present invention is to provide a closed fluid system having a first heat exchange portion for heating a heat storing means and a second heat exchange portion for cooling a cold storage means together with a radiation portion exposed to the universe, the fluid system being charged with a volatile fluid, as distinguished from being completely filled with a heat transfer liquid.

Figures 2, 3:
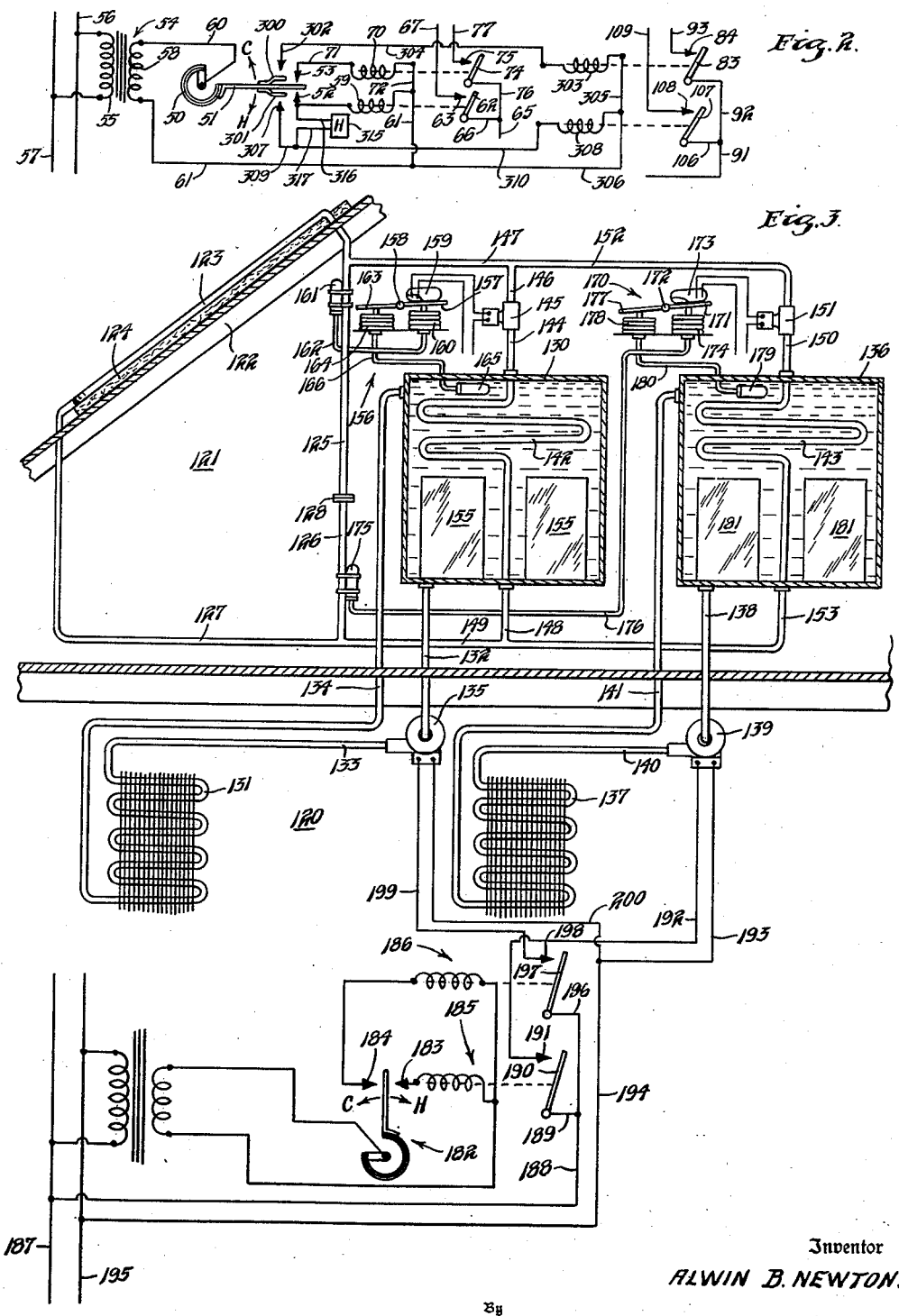

Other objects of the invention will become apparent from the following detailed description and the accompanying drawings, in which:

Figure 1 discloses one type of system constructed in accordance with my present invention wherein the closed fluid system is charged with a volatile fluid, Figure 2 is a modification of the system of Figure 1 employing a two-stage type space thermostat, and Figure 3 is a modified system in which the radiation device and associated heat transfer means are completely filled with a liquid.

Referring to Figure 1, a portion of a building is shown therein which includes a space 10 to be heated and cooled and a further space 11 which may, for example, be the attic or top floor of the building. Located in the attic 11 is a heat storing means shown in the form of a tank 12 filled with a suitable heat transfer medium, preferably one having a relatively low freezing point. The lower portion of the heat storing means 12 is connected to a heating coil 13 located in the space 10 by a pipe 14. The pipe 14 may contain any desired type of flow controlling means and such a means is herein shown as an electrically operated pump 15. The other end of the heating coil 13 is connected to the top of the heat storing means 12 by a pipe 16. In order to increase the heat storing capacity of the heat storing means 12, it may be provided with containers 17 which contain a substance, such as Wood's metal, as mentioned in the aforesaid patent, that solidifies at or about the temperature which it is desired to maintain in the heat storing means 12 in order that a larger amount of heat may be stored therein for a given capacity of the tank forming the heat storing means.

Also located in the attic 11 is a cold storing means 18 in the form of a tank which is likewise filled with a liquid. The bottom of the cold storing means 18 is connected to a cooling coil 19 by a pipe 20. The pipe 20 may be provided with any suitable flow controlling means herein shown as an electrically operated pump 21. The other end of the cooling coil 19 is connected near the top of the cold storing means 18 by a pipe 22. The cold storing means 18 may likewise be provided with containers 23 having suitable substances therein, such as listed in my aforesaid patent and including acetaldehyde, so as to increase the storage capacity of the cold storing means 18.

The heat storing means 12 and cold storing means 18 are arranged to be heated and cooled respectively by means of a closed fluid system that includes a first heat exchange portion 25, a second heat exchange portion 26, and a radiation portion 27. The heat exchange portion 25 takes the form of a coil located within the heat storing means or tank 12. Similarly, the heat exchange portion 26 comprises a pipe coil located within the cold storing means or tank 18. The radiation portion 27 also takes the form of a pipe coil but such radiation portion 27 is so located as to permit the radiation of heat to it from the sun as well as to permit the radiation of heat from the radiation portion 27 to the universe at night when the sun is not shining. To this end, the radiation portion 27 has been shown as located outside of the building. Although the radiation portion 27 in this diagrammatic showing is entirely exposed, it should be understood that it could be enclosed by some suitable means, such as one of the forms of Lucite, which permits the radiation both of high and relatively low temperatures so that the heat from the sun can be radiated to the radiation portion 27 during the daytime and at night the relatively higher heat of the radiation portion 27 may be radiated to the universe.

In addition, this closed fluid system includes a header 28, to the top of which the upper end of the radiation portion 27 is connected. Also, the lower end of the radiation portion 27 is connected to the lower portion of the header 28. The heat storing means 12 is located above the header 28 and the heat exchange portion 25 located therein has its upper end connected to the upper end of the header 28 by means of pipes 29 and 30. The lower end of heat exchange portion 25 is connected to the lower end of header 28 by pipes 31 and 32. The cold storing means 18 is located below the header 28 and the upper end of the heat exchange portion 26 is connected to the upper end of header 28 by means of a pipe 33, a check valve 34, a pipe 35, and pipe 30. The check valve 34, as indicated, permits the flow of fluid upwardly through the pipes 33 and 35 but prevents downward flow therethrough. The lower end of heat exchange portion 26 is connected to the lower end of header 28 by a pipe 36, electrically operated valve 37, and the pipe 32. This complete fluid system, which is entirely closed, is charged with a volatile fluid. This fluid may, for example, be methylchloride or any of the various Freons. The system is not completely filled with the fluid so that there is always a certain amount of liquid as well as a certain amount of gas or vapor, the liquid level being shown in the header 28 which is in cross-section.

The electrical valve 37 is herein shown controlled by a differential temperature responsive device 38 which responds to the difference in temperature between the liquid in the header 28 and the heat exchange fluid in the tank or cold storing means 18. This differential temperature responsive device 38 includes a pivoted arm 39 actuated by a pair of bellows 40 and 41. The bellows 40 bears on the left-hand side of the arm 39 and is connected, by means of the usual tubing 43, to a temperature controlling bulb 42 located in the tank 18. The bellows 41 bears on the right-hand side of arm 39 and is connected to a temperature responsive bulb 44, located in the header 28, by a tube 45. When the temperature of the fluid in the header 28 is substantially equal to the temperature of the liquid in the cold storing means, the arm 39 is substantially vertical, as shown, wherein it is disengaged from a contact 46. On the other hand, when the temperature is less in the header 28 than in the tank 18, the arm 39 swings to the right and engages contact 46 so as to energize and open the electrical valve 37 by a circuit which is obvious upon an inspection of the drawings.

With the parts in the position shown and assuming that it is in the daytime and the sun is shining, then the temperature of the radiation portion 27 will be relatively high due to the radiation of heat thereto from the sun. The volatile liquid contained in the radiation portion 27 will therefore be vaporized and this vapor will pass into the upper end of header 28 and then, by way of pipes 30 and 29, will pass to the head exchange portion 25. Since the temperature of the liquid in the tank 12 will not be as high as the temperature of the volatile fluid in header 28 under the action of the sun, the vapor or gas passing to the heat exchange portion 25 will be condensed therein until such time as the vapor pressure is commensurate with the temperature of the liquid in the tank 12. This condensed liquid will flow back to the header 28 by way of pipes 31 and 32. So long as the temperature of the radiation portion 27 is higher than the temperature of the liquid in the tank 12, this action will continue even though these temperatures vary. This is true since the vapor or gas will only be condensed by the heat exchanger 25 to an extent depending upon the temperature of the liquid in the tank 12. However, so long as the temperature of the radiation portion 27 is higher than the temperature of the liquid in the tank 12, further evaporation will take place in the radiator portion 27. On the other hand, if the sun should be so obscured as to reduce the temperature of the radiation portion 27 or if the temperature thereof becomes reduced by reason of night falling, then the radiation portion 27 will become the condenser. As soon as all the liquid within the heat exchanger 25 has been evaporated due to the higher temperature therein, and flows down to the header 28, there no longer will be vapor or gas present and, since the liquid cannot flow up to the heat exchanger 25, no further exchange of heat from the liquid in the tank 12 to the radiation portion 27 will take place. In this manner, heat exchange can take place in only one direction between the radiation portion 27 and the liquid in the tank 12 and this is in a direction to heat the liquid in the tank 12 when the radiation portion 27 is at a higher temperature than said liquid.

Let us now assume that the night is very clear and conditions are such that the liquid in the header 28 becomes cooler than the liquid in the tank 18. Under such conditions, the arm 39 will engage contact 46 and valve 37 will be energized. There is now free communication between the bottom of header 28 and the heat exchanger 26. Liquid will therefore flow through pipes 32 and 36 to the heat exchanger 26. Since the heat exchanger 26 is at a higher temperature than the liquid in the header 28, such liquid will be evaporated and will flow to the top of the header 28 by way of pipe 33, check valve 34 and pipe 35. Such evaporation of the volatile fluid removes heat from the liquid in the tank 18 so as to cool such liquid. In this manner, the cold storing means is cooled.

Thus, by the use of a volatile fluid and a single electrical valve together with a check valve, the radiation portion 27 is utilized to selectively cool the cold storing means and to heat the heat storing means. These stored heating and cooling capacities are then utilized to heat and cool the space 10 in accordance with demands in the following manner. The space 10 is provided with a room thermostat comprising a coiled bimetal element 50 having one end relatively fixed and supporting a contact arm 51 at its other end. The contact arm 51 is adapted to selectively engage hot and cold contacts 52 and 53. Power is supplied to the room thermostat by a transformer 54 of the step-down type having a high voltage primary 55, connected to suitable line wires 56 and 57, and the usual low voltage secondary 58. Upon a demand for cooling by the room thermostat so that the contact arm 51 engages the hot contact 52, a relay coil 59 is energized as follows: from the upper end of secondary 58, wire 60, room thermostat 50, contact arm 51, hot contact 52, relay coil 59, and wire 61 back to the lower side of secondary 58. Relay coil 59, when energized, moves a switch arm 62 into engagement with a contact 63. This energizes the electrical pump 21 by a circuit as follows: line wire 57, wire 64, wire 65, wire 66, switch arm 62, contact 63, wire 67, pump 21, wire 68, and wire 69 to line wire 56. The pump 21 thereupon forces the cold liquid in the tank 18 to the cooling coil 19 so as to reduce the temperature of the space 10.

If, on the other hand, the temperature of the space 10 becomes too cool, the arm 51 of the thermostat engages the cold contact 53. This energizes a relay coil 70 as follows: from the upper end of secondary 58, wire 60, room thermostat coil 50, contact arm 51, cold contact 53, wire 71, relay coil 70, wire 72, and wire 61 to the lower end of secondary 58. Energization of relay coil 70 moves a switch arm 74 into engagement with a contact 75 to thereby energize the electrically operated pump 15 by a circuit as follows: line wire 57, wire 64, wire 65, wire 76, switch arm 74, contact 75, wire 77, pump 15, wire 78, wire 9, and wire 69 to the other line wire 56. In this manner, when the room 10 is too cold, the pump 15 forces the heated water in the tank 12 to the heating coil 13 so as to raise the space temperature.

Under certain conditions, it may be impossible to store sufficient heat in the heat storage means 12 to adequately heat the space 10 and likewise it may be impossible to store sufficient cooling capacity to adequately cool the space 10. The present invention therefore contemplates providing an additional source of heat for the heat storing means 12 and an additional source of cooling for the cold storage means 18. To this end, a heating means in the form of a burner 80 is shown located under the heat storing means 12. This burner is supplied with fuel by a fuel supply pipe 81 in which is located an electrically operated valve 82. This valve is controlled in part by a switch arm 83 and associated contact 84 operated by the relay coil 70 and also in part by a thermostat 85 which responds to the temperature of the liquid in the heat storing tank 12. The thermostat 85 includes a pivoted arm 86 which supports a mercury switch 87 and is positioned by a bellows 88 that is in turn connected to a temperature responsive bulb 89 by a tube 90. The temperature responsive bulb 89 is located within the tank 12 so as to respond to the temperature of the liquid therein. When the temperature of this liquid is too low, the bellows 88 contracts permitting counter-clockwise movement of switch supporting arm 86 about its pivot, whereupon mercury switch 87 moves to its closed circuit position. Whenever the mercury switch 87 moves to its closed circuit position, and provided relay coil 70 is energized as a result of a demand for heat by the room thermostat, a circuit for the fuel valve 82 is established as follows: line wire 57, wire 64, wire 91, wire 92, switch arm 83, contact 84, wire 93, mercury switch 87, wire 94, fuel valve 82, wire 95, wire 78, wire 9, and wire 69 to the other line wire 56. Therefore, whenever the room thermostat demands heat, if the liquid in the tank 12 is not sufficiently hot as determined by the thermostat 85, then auxiliary heat is furnished to the heat storing means 12 by the burner 80.

In a similar manner, the cooling tank 18 is provided with a cooling coil 96 that is supplied with any suitable type of cooling means by a pipe 97. The flow through pipe 97 is controlled by an electrically operated valve 98, which is controlled in part by the relay coil 59 and in part by a thermostat 99. The thermostat 99 includes a switch arm 100 that carries a mercury switch 101 in turn positioned by a bellows 102 that is connected to a controlling bulb 103 by a tube 104. The bulb 103 is located within the tank 18 and the arrangement is such that when the temperature of the liquid in the tank 18 is too high, bellows 102 expands thereby tilting switch arm 100 so as to move mercury switch 101 to closed circuit position. When this occurs, the cooling valve 98 is opened provided the room thermostat is demanding cooling at such time. This circuit is as follows: line wire 57, wire 64, wire 91, wire 106, a switch arm 107 operated by relay coil 59, a cooperating contact 108, wire 109, mercury switch 101, wire 110, cooling valve 98, wire 111, wire 9, and wire 69 to the other line wire 56. In this manner, whenever there is a demand for cooling, and if the liquid in the cold storing means 18 is not sufficiently cold as determined by the thermostat 99, the cooling valve 98 is opened so as to further reduce the temperature of such liquid.

Figure 2 shows a modification of the control system of Figure 1 wherein the auxiliary heating and cooling means are normally brought into operation only upon a further fall or rise in the space temperature, as the case may be. Since many of the circuits are the same as those previously described in Figure 1, similar reference characters have been used on such circuits in Figure 2.

This action is accomplished by placing the control of switch arms 83 and 107 under additional relays operated by additional contacts on the space thermostat instead of operating such switch arms by the relay coils 70 and 69. To this end, the contact arm 51 of the room thermostat 50 is made relatively flexible. On one side of the contact arm 51 and at an intermediate point, a further contact arm 300 is attached. A similar contact arm 301 is attached to the other side of the contact arm 51 and at an intermediate point thereon. When the room temperature becomes somewhat lower than that value at which contact arm 51 engages contact 53, then the contact arm 300 engages a contact 302 and thus energizes a relay coil 303 by a circuit as follows: upper end of secondary 58, wire 60, element 50, contact arm 51, contact arm 300, contact 302, wire 304, relay coil 303, wire 305, wire 306, and wire 61 to the lower end of secondary 58. Energization of relay coil 303 moves switch arm 83 into engagement with contact 84 to establish the previously traced circuit for the valve 82 of the auxiliary heating means, provided the thermostat 85 which responds to the temperature of the stored heating fluid is closed.

When the temperature rises sufficiently above that value at which contact arm 51 engages contact 52, then contact arm 301 engages a contact 307 to energize a relay coil 308 as follows: upper end of secondary 58, wire 60, element 50, contact arm 51, contact arm 301, contact 307, wire 309, wire 310, relay coil 308, wire 306, and wire 61 to the lower end of secondary 58. Energization of relay coil 308 moves switch arm 107 into engagement with contact 108 to thereby energize the valve 98 of the auxiliary cooling means provided the temperature of the stored cooling fluid is sufficiently high that mercury switch 100 of the stored cooling fluid responsive thermostat 99 is closed.

Thus, with the arrangement of Figure 2, upon a first temperature fall the space will be heated by the stored heating fluid if such fluid is sufficiently high in temperature. However if this heating fluid is not at a high enough temperature so that the room temperature falls further, then the auxiliary heating means is brought into operation. This conserves upon the auxiliary heating means since it is obvious that it will not always be necessary to utilize auxiliary heat in order to maintain desired room temperatures. Similarly, during warm weather, upon rise in room temperature it is first attempted to reduce the room temperature by the stored cooling fluid without the use of any auxiliary cooling. However, if the stored cooling fluid is too high in temperature and the room temperature rises further, then and only then is the auxiliary cooling means brought into operation.

It is conceivable that the temperature of the stored cooling fluid may be sufficiently low to prevent excessive rise in room temperature and engagement of contact arm 301 with contact 307 but still not be low enough to cause any appreciable dehumidification. A space humidity controller 315 is therefore arranged in Figure 2 in such manner as to energize relay coil 308 and bring on the auxiliary cooling means upon high humidity even though the room temperature is not excessive. This circuit is as follows: upper end of secondary 58, wire 60, element 50, contact arm 51, contact 52, wire 316, humidity control 315, wire 317, wire 310, relay coil 308, wire 306, and wire 61 to the lower end of secondary 58. In this manner, upon an intermediate rise in room temperature and if the humidity is excessive, then the auxiliary cooling means is brought into operation so as to lower the temperature of the stored cooling fluid, under the control of thermostat 99, to reduce the temperature of the cooled fluid sufficiently to bring about a dehumidifying action.

Turning now to Figure 3, a further form of apparatus is disclosed which uses a closed liquid system. A room or space 120 to be heated and cooled comprises a portion of a house having an attic 121 and a roof 122. Located on the roof 122 is the radiation portion 123 of the closed liquid system. This radiation portion 123 is shown as being suitably insulated from the roof by insulating material 124. The liquid circuit through the radiation portion 123 is closed so as to form a complete or closed loop by means of pipes 125, 126 and 127. An orifice 128 is located between the pipes 125 and 126 so as to restrict the flow through this closed loop. In order to provide for expansion and contraction of the liquid in the closed liquid system, it may be provided with an expansion tank, if desired, as is usual practice in the heating art.

Located in the attic 121 is a heat storage means 130 in the form of a tank filled with liquid. This tank is connected to a heating coil 131 located in the room 120 by means of pipes 132, 133 and 134, there being an electrically operated pump 135 connected between pipes 132 and 133. Similarly, a cold storing means in the form of a tank 136 is likewise located in attic 121. This tank is filled with liquid and is connected to a cooling coil 137 located in the room 120 by a pipe 138, a pump 139, a pipe 140, and a pipe 141. The tanks 130 and 136 may also be provided with the usual expansion tanks if desired.

The closed fluid system, in addition to the closed loop, further includes a first heat exchange portion 142 located in the heat storage tank 130 and a second heat exchange portion 143 located in the cold storing tank 136. The upper end of heat exchange portion 142 is connected to the upper end of pipe 125 by pipe 144, an electrical valve 145, a pipe 146, and pipe 147. The lower end of the heat exchange portion 142 is connected to the junction of pipes 126 and 127 by pipes 148 and 149. Likewise, the upper end of heat exchange portion 143 is connected to the upper end of pipe 125 by a pipe 150, an electrical valve 151, a pipe 152, and pipe 147. The lower end thereof is connected to the junction of pipes 126 and 127 by a pipe 153 and pipe 149.

Assuming that the valve 145 is open and the valve 151 is closed and that it is daytime and the sun is shining, the radiation portion 123 will be at a relatively high temperature due to radiation from the sun. As mentioned above, this system is a liquid system which is completely filled with liquid as distinguished from a volatile fluid system. The liquid in the radiation portion 123 upon being heated will flow upwardly and part of it will flow continuously through the pipe 125, the restricting orifice 128, the pipe 126 and the pipe 127 to the lower end of the radiation portion 123. Also, since valve 145 is open, the major portion of this hot liquid will flow from the upper end of radiation portion 123 by way of pipe 147, pipe 146, valve 145, and pipe 144 to the heat exchanger 142. It will flow from the heat exchanger by way of pipes 148, 149 and 127 back to the lower end of the radiation portion 123. In this manner, the liquid in the tank 130 will be heated. In order to increase the heat storage capacity of the tank 130, containers 155 may be provided therein filled with a suitable substance as explained in connection with the containers 17 of Figure 1.

The valve 145 may be controlled in any desired manner. I prefer to control it by temperature and for this purpose provide a temperature responsive means 156. This temperature responsive means may take the form of a straight temperature thermostat but preferably takes the form of a differential temperature thermostat. It includes a switch operating arm 157 pivoted at 158 which carries a mercury switch 159. The arm 157 is operated by a bellows 160 connected to a temperature controlling bulb 161 by a tube 162. The bulb 161 is secured in any usual manner to the pipe 125 so that it responds to the temperature of the liquid flowing therethrough. With as much of the apparatus 156 as thus far described, the mercury switch 159 will be operated entirely by the temperature of the fluid or liquid flowing through the pipe 125. When the temperature of this liquid is high enough, say 90 degrees, the mercury switch 159 will be moved to the closed circuit position in which it is shown so as to open the valve 145, whereupon heating of the liquid in the tank 130 will take place. I prefer however to operate mercury switch 159 in accordance with the temperature differential between the liquid in tank 130 and the temperature of the fluid flowing through pipe 125. To this end, the arm 157 is provided with an extension 163 which extends to the left of pivot 158. A bellows 164 operates upon the extension 163 in opposition to the bellows 160. The bellows 164 is connected to a temperature controlling bulb 165 by a tube 166. The temperature differential instrument is set so that mercury switch 159 is only closed when the temperature of the liquid flowing through the pipe 125 is a predetermined amount higher than the temperature of the liquid in the tank 130. In this manner, whenever the temperature of the fluid is sufficiently high to raise the temperature of the liquid in tank 130, it is used for this purpose. This is better than having the plain thermostat since, under conditions where there has been no appreciable heating of the radiating portion 123 for a considerable length of time, the fluid in tank 130 might be cold enough that there would be no utility in waiting until the temperature of the liquid passing through pipe 125 has been raised to 90 degrees. Under such conditions, the liquid in tank 130 might well be heated even though the temperature of the liquid passing through pipe 125 were only 75 or 80 degrees.

Assume now that it becomes night and it is a clear night so that heat is radiated from the radiation portion 123 to the universe. Let us assume then that the temperature of such fluid in the radiating portion 123 becomes reduced to 65 degrees. Under these conditions, the liquid in tank 130 will be higher than 65 degrees so that the valve 145 is closed. However, let us assume that the valve 151 remains closed likewise. Now, since the temperature of the liquid in pipe 125 is higher than that in the radiation portion 123, the flow in the closed loop will be reversed. In other words, the warm water in pipe 125 will flow upwardly and enter the radiating portion 123 at the top. It will then flow downwardly through the radiating portion 123, where it will lose heat to the universe. It will then flow from the lower portion of radiating portion 123 to the lower end of pipe 126 by way of pipe 127. Let us now assume that the temperature of the water flowing through the closed loop is thus reduced to 60 degrees. At this time, let us assume that valve 151 is open. The flow of water through the closed loop of course is restricted by the orifice 128 and, with valve 151 open, the major portion of such cold water will flow from the lower end of radiation portion 123 through pipe 127, pipe 149, and pipe 153 to the lower end of heat exchanger 143 located in the cold storing means or tank 136. This flow of liquid will result in the lowering of the temperature in the tank 136. At the same time, such liquid flowing through the heat exchanger 143 will pick up heat and rise in temperature. This will help the liquid to continue its flow back to the upper end of the radiating portion 123 by way of pipe 150, valve 151, and pipe 152.

The valve 151 is automatically controlled by a temperature responsive mechanism 170. Here again, this temperature responsive mechanism 170 could comprise a simple thermostat. This mechanism includes an arm 171, pivoted at 172, which supports a mercury switch 173. The arm is operated by a bellows 174 connected to a temperature bulb 175 by a tube 176. The bulb 175 responds to the temperature of the liquid flowing through the pipe 126. If only a simple thermostat as thus far described is used, it could be set for example at 60 degrees so that mercury switch 173 would close whenever the temperature of the liquid flowing through pipe 126 fell to 60 degrees or lower. Under such conditions then, the valve 151 would be opened and the operation by which the liquid in tank 136 is lowered in temperature would take place as outlined above. Here again, however, I prefer that the temperature responsive mechanism 170 be a differential temperature type of apparatus so that cooling of the liquid in the tank 136 may take place even at temperatures of 75 or 70 degrees where no cooling action has been available for a substantial period, as for example due to the sky being cloudy for one or more nights. Arm 171 is therefore provided with an extension 177 against which a bellows 178 bears. The bellows 178 is connected to a temperature bulb 179 by a tube 180. The bulb 179 is located in the tank 136. This differential temperature responsive mechanism is set so that mercury switch 173 is closed whenever the temperature of the liquid flowing through pipe 126 is below that of the liquid in the tank 136 by a predetermined amount. In order to increase the storage capacity of the cold storing means 136, containers 181 may be placed therein filled with a suitable substance for storage purposes as explained in connection with the containers 23 in Figure 1.

The supplies of hot and cold liquid are utilized to cool the space 120 in the same manner as explained in connection with Figure 1. To this end, a room thermostat 182 is provided with hot and cold contacts 183 and 184 which respectively energize relays 185 and 186. Upon energization of relay 185 by reason of thermostat closing hot contact 183, the cooling pump 139 is operated by a circuit as follows: line wire 187, wire 188, wire 189, switch arm 190, contact 191, wire 192, cooling pump 139, wire 193 and wire 194 to the other line wire 195. On the other hand, when the room thermostat 182 engages its cold contact 184, the heating pump 135 is energized as follows: line wire 187, wire 188, wire 196, switch arm 197, contact 198, wire 199, heating pump 135, wire 200, and wire 194 to the other line wire 195.

From the foregoing, it will be seen that I have provided novel systems of heating and cooling by the use of heat and cold storing means that are respectively heated and cooled through the use of a radiation element or device that receives heat from the sun by radiation during the daytime and gives up heat to the universe by radiation during the night. Further, I have provided automatic control systems by means of which the radiation element selectively heats and cools the heat storing means and cold storing means and that further automatically control the application of such stored heating capacity and cooling capacity to the room or space to be controlled so as to maintain it within desired temperature limits. It will be obvious to those skilled in the art that many changes and rearrangements of the parts can be made, as well as variations in the systems of control, without departing from the spirit of my invention and it is therefore my intention to be limited only by the scope of the claims appended hereto.

I claim as my invention:

1. In a heating and cooling system of the type wherein radiation from and to the universe is utilized for heating and cooling a fluid medium, in combination, a heat storing means, a cold storing means, a closed fluid system having portions in heat exchange relation with said heat and cold storing means and a radiation portion exposed for radiation from and to the universe, and means to selectively render the said heat exchange portions effective and ineffective.

2. In a heating and cooling system of the type wherein radiation from and to the universe is utilized for heating and cooling a fluid medium, in combination, a heat storing means, a cold storing means, a closed fluid system having portions in heat exchange relation with said heat and cold storing means and a radiation portion exposed for radiation from and to the universe, and means including mechanism responsive to the temperature of the radiation portion of the fluid system operable to selectively render said heat exchange portions effective to heat said heat storing means or to cool said cold storing means.

3. In a heating and cooling system of the type wherein radiation from and to the universe is utilized for heating and cooling a fluid medium, in combination, a heat storing means, a cold storing means, a closed fluid system having portions in heat exchange relation with said heat and cold storing means and a radiation portion exposed for radiation from and to the universe, said system being charged with a partial fill of a volatile liquid, and means responsive to the temperatures of the cold storing means and said radiation portion of the fluid system for rendering the heat exchange portion for the cold storing means ineffective when the temperature of the cold storing means is less than that of the radiation portion.

4. In a heating and cooling system of the type wherein radiation from and to the universe is utilized for heating and cooling a fluid medium, in combination, a heat storing means, a cold storing means, a closed fluid system having portions in heat exchange relation with said heat and cold storing means and a radiation portion exposed for radiation from and to the universe, and means responsive to the temperature of said radiation portion of the fluid system for rendering one of said heat exchange portions operative to heat the heat storing means when said temperature is at or above a predetermined value and for rendering the other of said heat exchange portions operative to cool the cold storing means when said temperature is at or below a lower predetermined value.

5. In a heating and cooling system of the type wherein radiation from and to the universe is utilized for heating and cooling a fluid medium, in combination, a heat storing means, a cold storing means, a closed fluid system having portions in heat exchange relation with said heat and cold storing means and a radiation portion exposed for radiation from and to the universe, means responsive to the differential in temperature of said radiation portion and the heat storing means for rendering one of said heat exchange means operative to heat the heat storing means, and means responsive to the differential in temperature of said radiation portion and the cold storing means for rendering the other of said heat exchange means operative to cool the cold storing means.

6. In a heating and cooling system for a space, in combination, a closed fluid system including first and second heat exchange portions and a radiation portion arranged for transmission of heat from and to the universe by radiation, a heat storing means associated with said first heat exchange portion, a cold storing means associated with said second heat exchange portion, means to selectively render said heat exchange portions effective, and means responsive to the temperature of the space in control of the effect of said heat and cold storing means on the space.

7. In a heating and cooling system for a space, in combination, a closed fluid system including first and second heat exchange portions and a radiation portion arranged for transmission of heat from and to the universe by radiation, a heat storing means associated with said first heat exchange portion, a cold storing means associated with said second heat exchange portion, means to selectively render said heat exchange portions effective, means for additionally heating the heat storing means, means for additionally cooling the cold storing means, and means responsive to the temperature of the space in control of said additional heating and cooling means and for controlling the effect of said heat and cold storing means on the space.

8. In a heating and cooling system for a space, in combination, a closed fluid system including first and second heat exchange portions and a radiation portion arranged for transmission of heat from and to the universe by radiation, a heat storing means associated with said first heat exchange portion, a cold storing means associated with said second heat exchange portion, means to selectively render said heat exchange portions effective, means for additionally heating the heat storing means, means for additionally cooling the cold storing means, means responsive to the temperature of the space in control of said additional heating and cooling means and for controlling the effect of said heat and cold storing means on the space, and means responsive to the temperatures of said heat and cold storing means to prevent operation of said additional heating and cooling means.

9. In a heating and cooling system, a closed fluid system comprising a radiation portion exposed for radiation to and from the universe and a pair of heat exchange portions connected thereto in parallel, all charged with a volatile fluid, valve means for preventing flow of said fluid through one of said heat exchange portions, and means responsive to the temperatures of said one of the heat exchange portions and the radiation portion to close said valve means whenever the temperature of said heat exchange portion is less than the temperature of said radiation portion.

10. In a heating and cooling system, a closed fluid system comprising a radiation portion exposed for radiation to and from the universe, a restricted circuit closing portion for said radiation portion which permits only a restricted flow through the circuit closing portion, a pair of heat exchange portions connected in parallel with said circuit closing portion, valve means for selectively preventing flow through said heat exchange portions, and means responsive to the temperature of the fluid flowing through said circuit closing portion in control of said valve means.

11. In a temperature changing system of the type wherein heat interchange with the universe is utilized, in combination, a temperature changing fluid storing means, means exposed to the universe and in heat exchange relationship with said fluid storing means to effect an interchange of heat and change of temperature therewith by radiation, auxiliary temperature changing means for additionally changing the temperature of said stored temperature changing fluid, and temperature responsive means operable at a first temperature value to render said stored temperature changing means effective to produce a temperature change and operable upon a second temperature value upon change in temperature in the same direction to permit operation of said auxiliary temperature changing means.

12. In a temperature changing system of the type wherein heat interchange with the universe is utilized, in combination, a temperature changing fluid storing means, means exposed to the universe and in heat exchange relationship with said fluid storing means to effect an interchange of heat and change of temperature therewith by radiation, auxiliary temperature changing means for additionally changing the temperature of said stored temperature changing fluid, temperature responsive means operable at a first temperature value to render said stored temperature changing means effective to produce a temperature change and operable upon a second temperature value upon change in temperature in the same direction to permit operation of said auxiliary temperature changing means, and means responsive to the temperature of the stored temperature changing fluid for preventing operation of said auxiliary temperature changing means.

13. In a cooling system for a space, in combination, a cooling fluid storing means for cooling the space, means exposed for radiation to the universe for cooling said cooling fluid storing means, auxiliary cooling means for cooling said stored cooling fluid, means responsive to space temperature in control of the effect of said stored cooling fluid, and means responsive to the moisture content in the space in control of said auxiliary cooling means.

14. In a cooling system for a space, in combination, a cooling fluid storing means for cooling the space, means exposed for radiation to the universe for cooling said cooling fluid storing means, auxiliary cooling means for cooling said stored cooling fluid, means responsive to a first rise in space temperature in control of the effect of said stored cooling fluid and responsive to a second rise in space temperature in control of said auxiliary cooling means, and means responsive to a high moisture content in the space also in control of said auxiliary cooling means.

15. In a heating and cooling system of the type wherein radiation from and to the universe is utilized for heating and cooling a fluid medium, in combination, a heat storing means, a cold storing means, a closed fluid system having portions in heat exchange relation with said heat and cold storing means and a radiation portion exposed for radiation from and to the universe, said closed fluid system being partially filled with a volatile liquid, the portion of said system in heat exchange relation with the cold storing means being filled with said liquid, and means responsive to the temperature of the cold storing means and said radiation portion of the fluid system for rendering the heat exchange portion for the cold storing means ineffective when the temperature of the cold storing means is less than that of the radiation portion.

16. In a heating and cooling system, a closed fluid system comprising a radiation portion exposed for radiation to and from the universe and a pair of heat exchange portions connected thereto in parallel, all charged with a volatile fluid, a portion of the charge normally being in the liquid state, valve means for preventing flow of said liquid portion of the charge through one of said heat exchange portions, and means responsive to the temperatures of said one of the heat exchange portions and the radiation portion to close said valve means whenever the temperature of said heat exchange portion is less than the temperature of said radiation portion.

ALWIN B. NEWTON.